Feb. 13, 1951   S. H. HAHN   2,541,512
ICING INDICATOR SYSTEM
Filed Feb. 19, 1945
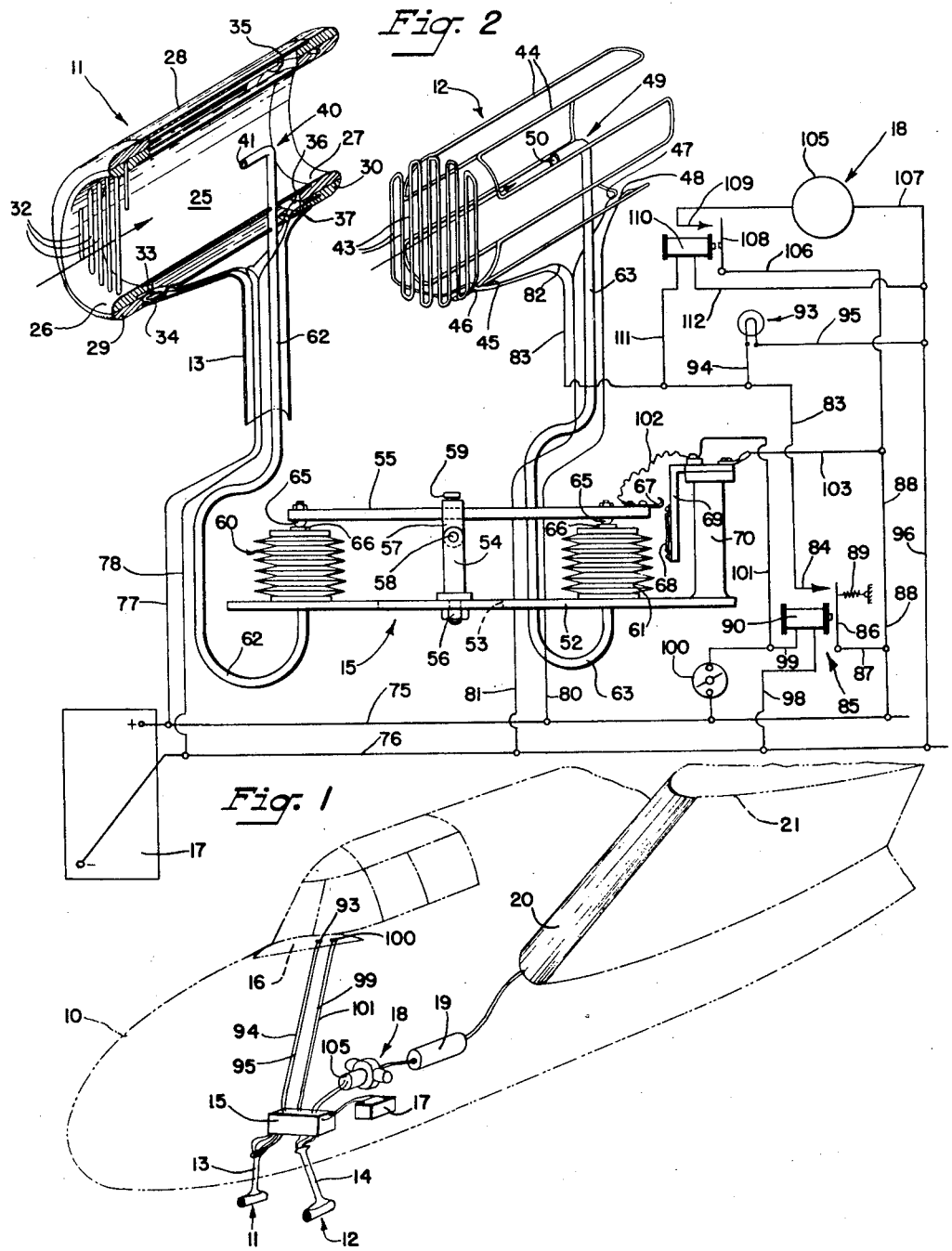
INVENTOR
STUART H. HAHN
BY George F. Goodyear
ATTORNEY Patented Feb. 13, 1951

2,541,512

UNITED STATES PATENT OFFICE 2,541,512

ICING INDICATOR SYSTEM

Stuart H. Hahn, Phoenix, Ariz., assignor to Curtiss-Wright Corporation, a corporation of Delaware Application February 19, 1945, Serial No. 578,717

11 Claims. (Cl. 244—134)

The present invention relates generally to systems for detecting the ice forming characteristic of air in motion, and more particularly to improvements in such systems whereby ice formation conditions may be more accurately made known.

It is an aim and object of this invention to improve upon certain prior and similar ice detecting systems and instruments in a novel manner and to increase the accuracy and sensitivity thereof.

It is also an object hereof to provide an ice formation detection system which will act in a manner to accentuate the atmospheric condition desired to be made known.

An object is to provide a system for detecting the formation of ice on aircraft surfaces by means of an air stream sampling device which is responsively sensitive to icing conditions for the purpose of effecting the operation of a pilot warning system or for initiating the operation of a deicing system associated with the aeroform surfaces.

A further object is to be found in the arrangement of means for measuring the tendencies of air to form ice on exposed surfaces and for indicating the persistence of ice formation automatically and positively.

In carrying out the objects of the invention it is preferred to utilize a pair of spaced air flow heads which are positioned to receive a stream of air and direct the air over electrical resistance grid elements for the purpose of inducing the formation of ice when atmospheric conditions have reached the critical conditions. A suitable electrical or electro-mechanical system is associated with each of these grid elements and current is supplied continuously to one element to protect the same against ice formation by resistance heating. The other grid element is allowed to ice up and is then periodically deiced so long as icing conditions persist. Electrical system control is then obtained through impact air pressure responsive means which operates in response to the difference in air pressure between the protected grid and the periodically unprotected grid, it being important to arrange each grid element originally to impose the same degree of resistance or impedance to air flow such that the system is initially balanced. Thus icing up of one grid will unbalance the system and hence develop a direct response to the desired atmospheric condition at all times.

The preferred arrangement above noted is disclosed in greater detail in connection with its application to aircraft, but it should be recognized that the invention is also well adapted for use in a variety of other instances where it is desired to ascertain atmospheric icing characteristics.

For a more complete understanding, reference should be had to the following detailed discussion of a preferred embodiment of the present invention disclosed by the accompanying drawing, in which:

Figure 1 is a schematic view, in perspective, of the present invention as applied to an aircraft, the aircraft being indicated as having suitable means for combating the accumulation of ice thereon, and Figure 2 is a diagrammatic disclosure of the preferred arrangement of elements and associated circuit connections for obtaining by mechanically and electrically responsive means an indication of icing conditions.

When applied to an aircraft shown in outline at 10 of Figure 1 the present indicator system includes a pair of identical, spaced air flow conduit means or air flow heads 11 and 12 mounted on standards or brackets 13 and 14 respectively, the latter being affixed to the under surface of the fuselage as shown, or positioned at any other location found desirable. The relay mechanism for interpreting the air flow characteristics is shown generally at 15 in this view, while the details thereof are more fully disclosed in Figure 2. Appropriate electrical and other system connections are also indicated in Figure 1, together with a second circuit which extends to an instrument board 16 located in the pilot's cockpit, these circuits being more fully explained in connection with Figure 2. Other operating means for completing the entire system include a source of electrical current 17, a combination motor, air distributor valve and oil separator unit 18, an air filter means 19, and a suitable de-icer boot or bag 20 positioned along the leading edge of the main wing 21 of the aircraft 10. It is of course assumed that other de-icer boots or similar means may be used at the leading edges of the empennage surfaces and at critical points over the exterior surfaces of the aircraft found to be affected by ice accretion, all such de-icer means being rendered operative automatically by the ice sensing system or the same may be operated manually.

Referring now to the disclosure of Figure 2 it will be observed that the air flow head 11 comprises an inner tubular member 25 affixed to leading and trailing annular ring elements 26 and 27 respectively, and an outer tubular member 28 affixed to leading and trailing ring elements 29 and 30 respectively. The adjacent and concentric pairs of ring elements 26 and 29 and 27 and 30 are adapted to contact each other in the manner shown whereby the tubular members are held in spaced relation to form a hollow shell structure. The whole head structure 11 is provided with a smooth inner and outer surface by suitably recessing the tubular members in their respective leading and trailing ring elements, as shown. Further, the entering and trailing edges of these mating rings are rounded off in order to reduce as much as possible resistance and turbulence to the flow of air through the inner tubular member 25. This structure is then mounted on a mast-like standard 13 which is, in turn, secured to the aircraft either in the position shown in Figure 1 or at any other position found suitable for the purpose.

This air flow head 11 is provided with an electrical resistance type grid, shown at 32 as comprising spaced parallel filament elements arranged substantially transversely of the air inlet. The grid is secured in such position by a circumferential groove formed in the parting surfaces of ring elements 26 and 29 and by suitable apertures through the inner ring 26. The grid terminal wires are indicated at 33 and 34. This head structure is also provided with a heater coil 35 suitably disposed in the space between the inner and outer tubes 25 and 28. The heater coil is anchored at its forward ends between ring elements 26 and 29 and at its rearward ends between the ring elements 27 and 30 and terminals of the coil are indicated at 36 and 37. In addition to the grid 32 at the air inlet and the coil 35, there is provided a total head tube or Pitot means 40 which extends through the shell tubes 25 and 28 at a location somewhat aft of the longitudinal center of the head and radially inwardly such that the air inlet orifice 41 is positioned at or in the vicinity of the center of the air stream flowing through the head 11. In this arrangement the Pitot tube 40 is adapted to sample the impact pressure of the air flow and hence it is desirable that the spacing from grid to orifice be of sufficient extent to place the same beyond the zone of turbulent air for greater accuracy.

The second air flow head 12 is identical as to structure and arrangement to the above described head 11. However, for a clearer view of the grid and heating coil elements 43 and 44 respectively of this second head, the shell structure has been omitted. Therefore, it will be understood herein that each of the air flow head means is constructed in accordance with the disclosure thereof for the head 11 and that the grid and heating coil will correspond to that disclosed in connection with the head 12. The terminal ends for the grid 43 are indicated at 45 and 46, and the heating coil terminals at 47 and 48. A second Pitot tube 49 is utilized with the head 12 and this Pitot has its orifice 50 directed into the air stream for sampling the impact air pressure.

The relay unit 15 includes a suitable base 52 having a slotted aperture at 53 for receiving an upstanding pivot post 54 upon which is mounted a rocker arm or beam member 55. The post 54 is adjustably mounted in the slot and is secured therein by a nut 56. Further the beam 55 is also adjustably or slidably mounted in a pivot mount 57 such that the two parts 54 and 57, pivotally jointed by a pivot pin 58, may be moved along the length of the beam to the extreme limits of the slot 53 if so desired. A set screw 59 is provided to secure beam 55 with respect to the pivot mount 57 when desired adjustments have been made. Upon opposite sides of the post 54 are positioned a pair of bellows 60 and 61, the bellows being suitably secured at one end to the base plate 52, while the opposite end is free to move in a direction transversely to the beam 55. Bellows 60 then is suitably connected by a capillary tube 62 with the Pitot tube 40 in head 11 and bellows 61 is likewise connected by a capillary tube 63 with the Pitot tube 49 in head 12.

Accordingly, each of these bellows will be responsive to the changes in pressure of the air flowing through the head unit with which it is associated. In this manner the beam 55 can be made to swing about the pivot pin 58 as the bellows collapse or expand differentially and in response to air pressure variations between the spaced air flow heads 11 and 12. For this purpose the arm 55 is provided with suitable wearing elements 65, one at or near each end thereof for contact with pressure pads 66 carried on the adjacent bellows structure. In addition, the arm 55 carries an electrical contact element 67, at the end adjacent the bellows 61, for cooperation with a second, fixed electrical contact member 68. This second contact 68 is supported on a conductor bar 69 in turn secured to an upstanding insulator pedestal 70 mounted on base plate 52.

So long as there is no difference in this pressure each bellows will exert substantially the same upward thrust on the arm 55 and no swinging movement thereof can result. However, if a restriction is placed in the path of the air flow through one head means and not the other a drop in pressure at that head means so affected will cause or result in a proportionate and corresponding collapse of the associated bellows. Immediately the opposite bellows will expand to take up any slack in the bellows system and raise the adjacent end of the arm 55 until a new position of equilibrium has been reached. The swinging or tipping of the arm can be utilized to interrupt or complete an electrical circuit system and hence cause deenergization or energization of indicator or control instrumentalities in such circuit system.

Accordingly, when the present device is utilized as an ice indicator, the air flow head means 11 and 12 are disposed in a position to be responsive to free stream air pressure developed as a result of the forward motion of the aircraft. The impact air pressure at each Pitot tube 40 and 49 is substantially equal because the respective grid wires 32 and 43 offer the same resistance to such air flow. In this condition the bellows 60 and 61, arm 55, pivot post 54 and pivot mount 57 will assume the positions shown in Figure 2. Electrical contacts 67 and 68 will then be opened or in position to maintain open an electric circuit later to be described in connection with the electrical system including grids 32 and 43 and shell heating coils 35 and 44. It is noted here that in normal operation the heating coils 35 and 44 are continuously energized and thus functioning to prevent icing of the shell structure and that grid 32 is also continuously heated for the same reason. Grid 43 then is exposed and offers a multiplicity of surfaces for ice accretion if atmospheric conditions are conducive to the formation of ice. So long as the air flow across an exposed surface such as the wings 21 or grid wires 43 is free of icing tendencies, the present indicating system will be inactive as the air flow pressure at the Pitot tubes 40 and 49 will be substantially equal and arm 55 will be maintained in position to hold contacts 67 and 68 open.

The electrical system illustrated in Figure 2 comprises in part a source of electrical energy as the battery 17 which supplies current to buss bars 75 and 76, and a first branch circuit 77 and 78 which supplies current to the heater coil 35 and grid 32 at the respective terminals 36 and 34, and 37 and 33. The coil 35 and grid 32 are thus placed in parallel and supplied with heating energy at all times. A suitable branch circuit cut out switch or master switch (not shown) may be used to de-energize any part of or the entire system as is obvious. A second branch circuit 80 and 81 supplies current to the heater coil 44 at terminals 48 and 47 respectively. In this branch circuit the grid 43 is connected at its terminal 45 to the circuit lead 81 by connector lead 82. The opposite terminal 46 of this grid is associated with the lead wire 83 which finds its normally open terminal at contact 84, the open contact 84 being so maintained by the relay 85. The movable contact arm 86 of relay 85 is provided with a lead 87 which connects with lead 88, the latter being connected to the buss 75. Hence when contact is established between terminal 84 and arm 86, by the energization of the relay solenoid 90, the grid 43 is placed across the buss bars 75 and 76 by leads 88 and 81 respectively. Also, when this latter grid circuit is completed by relay 85 an indicator signal lamp or other visual or audible means is operated. In the system shown a signal lamp 93 is lighted through a lamp circuit lead 94 from line 83 on one side, and a lead wire 95 from the branch line 96. The lamp circuit is then established, upon proper relay action, from buss 76 to line 96, wire 95, lamp 93, connector 94, line 83, relay contacts 84 and 86, connector 87, line 88 and back to the opposite buss 75.

Energization of the grid 43 is provided by the relay 85 and actuation of the relay is effected by the resultant reaction of bellows 60 and 61 upon contacts 67 and 68. Normally these latter contact points are maintained open due to substantially equal upward bellows thrust on beam or arm 55, and this despite the off center position of the pivot forming elements 54 and 57 with respect to the arm or beam 55. However, when ice accretion at grid 43 affects the total head pressure sensed by the Pitot tube 49 sufficiently to cause a predetermined degree of collapse of bellows 61 and consequent overbalance on arm 55 by bellows 60, contacts 67 and 68 will close. In this event a holding circuit for the relay coil 90 will be established and arm 86 will move into contact with contact 84. The relay coil circuit includes a lead 98 from buss bar 76, coil 90, lead 99, lead 101, flexible lead 102, contact 67, contact 68, conductor bar 69, lead 103 and line 88 which returns to the opposite buss 75.

It should be evident now that, while the unprotected grid 43 is free of ice, the bellows 60 and 61 are fully responsive to identical impact pressures sensed by Pitot tubes 40 and 49 and as a consequence the relay is deenergized and spring 89 acts to hold arm 86 out of circuit connection with contact 84. Therefore, as ice forms on the grid 43 a drop in pressure at Pitot 49 results and when the pressure drop has reached a desirable or predetermined low limit the contacts 67 and 68 will close thus energizing relay coil 90. Immediately, or with such time delay as the relay 90 may be arranged to provide, the grid circuit is completed at contacts 84 and 86 and the ice accumulation is removed by heat energy from battery 17. Concurrently, the warning lamp 93 lights up informing the pilot that the aircraft is encountering icing conditions. The resulting electro-mechanical action of the bellows type relay 15 and the electrical relay 85 will serve to cycle the system so long as grid 43 continues to accumulate ice after each de-icing period. The warning means or lamp 93 will follow this exact cycle and continuously inform the pilot concerning the persistence of icing conditions.

In Figure 1 the warning lamp 93 and a switch 100 have been indicated as located on panel 16. Switch 100 is included in the relay circuit (see Figure 2) as a means whereby the pilot may test the circuit to grid 43. Closing of the switch will obviously energize relay coil 90 and lamp 93 will flash on if the circuit is complete and relay 85 functioning properly.

In one application of this invention the warning system is merely intended to inform the pilot of the aircraft concerning atmospheric icing characteristics. Therefore, the de-icing equipment for the aircraft must be set in operation independently of the action of the warning system, as by energizing the operating unit 18. The function of unit 18 is believed to be well understood in this art and hence no detailed disclosure or description is included here. Suffice it to mention that unit 18 controls the supply of air under pressure to the boot 20 in a predetermined series of impulses and alternately to one or more air cells formed in the boot, the effect produced being to fracture the ice sheet at or in the vicinity of the leading edge of the surface sufficiently for the air flow to carry away the major portion thereof.

While the manual control system may be useful in some installations, it is preferred that the cycling control set up by the bellows 60 and 61 in conjunction with the relay for the resistance wire grid at the entrance to the flow head 12 be used to initiate operation of the deicer unit 18. One such automatic system is shown in Figure 2 where the motor 105 of unit 18 is electrically connected across the buss bars 75 and 76 by means of leads 88 and 96 respectively and corresponding branch leads 106 and 107. A normally open relay switch element 108 and cooperating contact point 109 is disposed in lead 106 to the motor, and this switch is controlled by means of its relay solenoid 110. Power for this solenoid is supplied from line wire 83 through solenoid lead 111 on one side, and through lead 112 to branch conductor 96 on the other side. Therefore, when relay 85 is energized as previously described to complete a circuit through lead wires 83, 87 and 88, the relay solenoid 110 will be energized and contacts 108 and 109 closed. Motor 105 will then operate to initiate the actuation of deicer boots, as the one shown at 20 in Figure 1.

The present detailed description has covered the preferred arrangement of an ice indicator system designed to warn the pilot of an aircraft when atmospheric conditions are conducive to ice formation. The system is automatic and repeating in nature so that the rate of ice accretion may be made known through a flashing signal lamp. Moreover, the rate of ice accretion is positively indicated by means of a pair of flow heads which are normally balanced against free stream air pressure with one of the head means fully protected against icing conditions. Therefore, the system is substantially independent of variations in stream velocity and as a result, exceedingly accurate in operation.

It should be pointed out that the heating coils 35 and 44 which are continuously in circuit with the battery 17 are necessary to prevent ice accumulation at the respective Pitot tubes 40 and 49 under severe icing conditions. For example, the fully protected flow head 11 is heated by its grid and coil sufficiently to assure an air temperature in the vicinity of the Pitot of approximately plus 70 degrees Fahrenheit. The cooperating air flow head 12 is generally at a lower temperature while the grid 43 is not being deiced, but the heater coil 44 must be designed to prevent ice accumulation in or over the Pitot orifice 50 so that the air pressure responsive relay 15 will be fully operative for cycling the system.

A single flow head could be used for sensing icing conditions, but the use of two such units is conducive to more accurate and reliable determinations. Obviously, certain modifications may be made herein without departing from the scope of the invention hereafter defined in the appended claims.

What is claimed is:

1. In apparatus for detecting aircraft icing conditions, a tube arranged in an airstream for passage of air therethrough, grid means extended across the tube for collecting ice to reduce the flow of air through the tube in the presence of icing conditions, means for sensing reduction of airflow through the tube including an element arranged within the tube in longitudinally spaced relation to said grid means, means for heating said tube continuously to prevent accumulation of ice on the tube interior in the region of said element while ice is collecting on said grid means, and means responsive to reduction of airflow through the tube to deice said grid intermittently.

2. In apparatus for detecting aircraft icing conditions, a tube arranged in an airstream for passage of air therethrough, grid means comprising an electrical heater extended across the tube for collecting ice to reduce the flow of air through the tube in the presence of icing conditions, means for sensing reduction of airflow through the tube including an element arranged within the tube in longitudinally spaced relation to said grid means, and anti-icing means operatively and continuously connected to the tube for preventing accumulation of ice on the tube interior in the region of said element while ice is collecting on said grid means, and means responsive to grid icing intermittently to energize said grid electrically to heat the grid for deicing thereof.

3. In apparatus for detecting aircraft icing conditions, a tube arranged in an airstream for passage of air therethrough, grid means extended across the tube adjacent the mouth thereof for collecting ice to reduce the flow of air through the tube in the presence of icing conditions, means for sensing reduction of airflow through the tube including an element arranged within the tube in longitudinally spaced relation to said grid means, means for heating said tube to prevent accumulation of ice on the tube interior in the region of said element while ice is collecting on said grid means, and means for at times removing such ice from the grid means.

4. In apparatus for detecting aircraft icing conditions, a tube arranged in an airstream for passage of air therethrough, grid means including an electrical resistance element extended across the tube adjacent the mouth thereof for collecting ice to reduce the flow of air through the tube in the presence of icing conditions, means for sensing reduction of airflow through the tube including an element arranged within the tube in longitudinally spaced relation to said grid means, means for heating said tube to prevent accumulation of ice on the tube interior in the region of said element, and means for at times applying an electric current to said resistance element to remove such ice from the grid means.

5. In apparatus for detecting aircraft icing conditions, a tube arranged in an airstream for passage of air therethrough, said tube having hollow walls, grid means extended across the tube for collecting ice to reduce the flow of air through the tube in the presence of icing conditions, means for sensing reduction of airflow through the tube including an element arranged within the tube in longitudinally spaced relation to said grid means, and means for applying heat to the hollow of said walls to prevent accumulation of ice on the tube interior in the region of said element while ice is collecting on said grid means.

6. In apparatus for detecting aircraft icing conditions, a tube arranged in an airstream for passage of air therethrough, said tube having spaced inner and outer wall portions, grid means extended across the tube for collecting ice to reduce the flow of air through the tube in the presence of icing conditions, means for sensing reduction of airflow through the tube including an element arranged within the tube in longitudinally spaced relation to said grid means, and means including an electrical resistance element disposed between said wall portions for heating said tube to prevent accumulation of ice on the tube interior in the region of said element while ice is accumulating on said grid means.

7. In apparatus for detecting aircraft icing conditions, a tube arranged in an airstream for passage of air therethrough, grid means extended across the tube for collecting ice to reduce the flow of air through the tube in the presence of icing conditions, means for sensing reduction of airflow through the tube including a Pitot element opening into the tube downstream from said grid means, and means for heating said tube to prevent accumulation of ice on the tube interior in the region of said opening of the Pitot element while ice is collecting on said grid means.

8. In apparatus for detecting aircraft icing conditions, a pair of tubes arranged in an airstream for passage of air therethrough, each tube having grid means extended thereacross, means for heating the grid means of one tube to prevent the accumulation of ice thereon while ice is collecting on the grid means of the other tube in the presence of icing conditions, means for sensing changes in the relative airflow through the tubes due to such collection of ice, said sensing means including an element arranged in each of said tubes in longitudinally spaced relation to the grid means thereof, and means for heating both of said tubes to prevent accumulation of ice on the tube interiors in the region of said elements while ice is collecting on the grid means of said other tube.

9. In apparatus for detecting aircraft icing conditions, a pair of tubes arranged in an airstream for passage of air therethrough, each tube having grid means extending thereacross adjacent the mouth thereof, means for heating the grid means of one tube to prevent the accumulation of ice thereon while ice is collecting on the grid means of the other tube in the presence of icing conditions, means for sensing changes in the relative airflow through the tubes due to such collection of ice, said sensing means including a Pitot element opening into each of said tubes downstream from the grid means thereof, and means for heating both of said tubes to prevent accumulation of ice on the tube interiors in the region of said Pitot elements while ice is collecting on the grid means of said other tube.

10. In apparatus for detecting aircraft icing conditions, a pair of tubes arranged in an airstream for passage of air therethrough, each tube having grid means extending thereacross adjacent the mouth thereof, means for heating the grid means of one tube to prevent the accumulation of ice thereon while ice is collecting on the grid means of the other tube in the presence of icing conditions, means including an element in each tube for sensing changes in the relative airflow through the tubes due to such collection of ice, means for heating both of said tubes to prevent accumulation of ice on the tube interiors in the region of said elements while ice is collecting on the grid means of said other tube, and means for at times heating the last mentioned grid means to remove ice accumulated thereon.

11. In apparatus for detecting aircraft icing conditions, a pair of tubes arranged in an airstream for passage of air therethrough, each tube having grid means extending across the path of the airstream therethrough, means including an element arranged in each tube in longitudinally spaced relation to the grid means thereof for sensing changes in the relative airflow through the tubes, and means for preventing accumulation of ice on the interiors of both tubes in the region of said elements and on the grid means of one tube while ice is collecting on the grid means of the other tube.

STUART H. HAHN.

REFERENCES CITED

The following references are of record in the file of this patent:

UNITED STATES PATENTS

| Number | Name | Date |
|---|---|---|
| 475,442 | Cuttriss | May 24, 1892 |
| 1,794,690 | Horni | Mar. 3, 1931 |
| 1,971,534 | Peace | Aug. 28, 1934 |
| 2,127,823 | Leifheit | Aug. 23, 1938 |
| 2,159,186 | Tyler | May 23, 1939 |
| 2,254,155 | Reichel | Aug. 26, 1941 |
| 2,315,019 | Samuelson | Mar. 30, 1943 |
| 2,325,018 | Moss | July 20, 1943 |
| 2,358,804 | Holloman et al. | Sept. 26, 1944 |

FOREIGN PATENTS

| Number | Country | Date |
|---|---|---|
| 446,983 | Great Britain | May 11, 1936 |
| 622,993 | Germany | 1935 |